Oct. 16, 1956  A. S. WEBER  2,766,960
PORTABLE HOLDING DEVICE
Filed Dec. 30, 1952
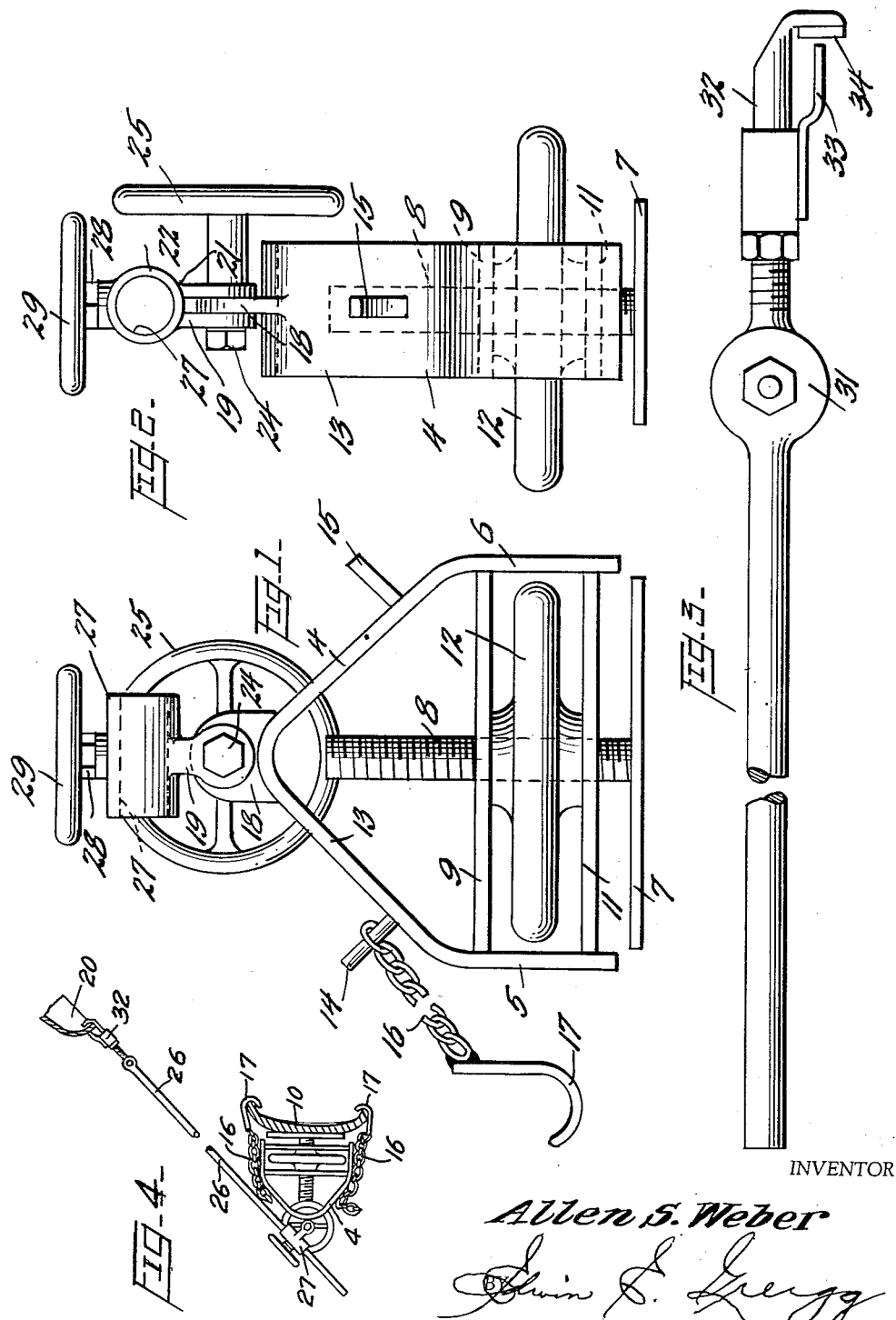
INVENTOR
Allen S. Weber
ATTORNEY

United States Patent Office 2,766,960
Patented Oct. 16, 1956

2,766,960

PORTABLE HOLDING DEVICE

Allen S. Weber, Baltimore, Md.

Application December 30, 1952, Serial No. 328,784

5 Claims. (Cl. 248—354)

This invention relates generally to portable holding devices and more particularly to a portable device for holding open a closure member of a vehicle such as a trunk cover, engine cover, or the like.

With the ever increasing demand for repair services on and about automotive vehicles, a definite need exists for an inexpensive, simple, compact and portable device to positively hold open such vehicle closure members as trunk covers (more popularly know as lids or decks), engine covers (again more popularly known as hoods), and the like, whenever the occasion arises for repair services to be performed within the areas normally enclosed by such covers. This is particularly true in the case of older vehicles wherein such holding devices as may have been built in by the vehicle manufacturer have become unreliable or inoperative or in the case of damaged vehicles wherein the manufacturer installed holding devices have become damaged and inoperable.

Such covers are normally large, bulky, and heavy, and unless a completely reliable holding device is provided when mechanics are working underneath the raised covers, serious personal injuries could result in the event of an untimely closure of such covers. In addition to being reliable, a holding device should be portable to give maximum flexibility of use and simplicity should be an important requirement to reduce to a minimum the time required to install and use same. Naturally, an inexpensive device has maximum appeal to a group of artisans already required to possess a considerable investment in tools and equipment.

All of the above requirements for a holding device are met by the novel design disclosed herein, resulting in another useful and practical tool for the automotive mechanics.

In essence, the subject invention comprises a main body in the form of a rugged metal frame adapted to be rigidly clamped to almost any part of a vehicle, particularly those parts nearest the closures to be held open. An elongated rod is pivotally mounted on the frame in such a manner that its holding end can be adjusted at different heights above the frame and at different angles thereto. Suitable clamping means are provided on the holding end to firmly grasp the closure being held open. All of the parts may be of rugged metallic members and the manner of assembly permits quick attachment and reliable use. The use of enlarged manually adjustable wheels simplifies the use of the device. Finally, the simplicity in design lends itself to economical manufacturing.

The above advantages and benefits to be derived from the subject invention will be readily understood upon reference to the detailed specification set forth below, when taken in conjunction with the drawings annexed hereto, in which:

Figure 1 is a plan view in elevation of the subject holding device, and;

Figure 2 is a side view in elevation of the arrangement shown in Figure 1, and;

Figure 3 is a view showing the elongated rod that cooperates with the member shown in Figure 1, and;

Figure 4 is a side view in elevation, on a reduced scale, of the subject holding device, and also showing in section, portions of a vehicle bumper and trunk lid to which the holding device is attached.

Referring first to Figure 1, the improved holding device comprises a main supporting body in the form of a rugged metallic substantially U-shaped frame 4 having the legs 5, 6. A first clamping means is carried by frame 4 between the legs 5, 6 and comprises the plate 7 to which is rigidly attached, by means of welding or the like, the elongated threaded shank 8. The shank 8 extends rearwardly from plate 7 between the legs 5, 6 and through aligned apertures in the transverse reinforcing straps 9, 11 rigidly mounted in any suitable manner between the legs 5, 6.

A captive nut 12 surrounds the shank 8 and this nut may be in the form of an enlarged wheel for maximum ease in manipulation. Obviously, rotation of nut 12 causes the plate 7 to move toward and away from the frame 4.

It is to be noted that the inner portion of legs 5, 6 are bent inwardly toward each other, forming the V-shaped section 13. On the sides of this V-section, and projecting outwardly therefrom at approximate right angles thereto, are the studs 14, 15, the axes of which form acute angles with plate 7.

The studs 14, 15 cooperate with a pair of flexible members, one of which is shown in the form of a metallic chain 16, having the hook 17 at one end thereof.

The chains 16 form the second clamping means carried by frame 4 and from the arrangement so far described, its use will be apparent. Suppose, for example, that one wishes to clamp the frame 4 to the rear bumper 10 of a vehicle. The hooks on the ends of chains 16 will be fastened around the top and bottom inner edges of the bumper, assuming the bumper to be the substantially universal channel shaped member having its channel facing inwardly and as illustrated in Figure 4. Next the plate 7 will be brought up against the outer surface of the bumper in such fashion that the studs 14, 15 be one above the other. The chains 16 are then brought over the bumper and slipped over the studs 14, 15 to hold the frame loosely in place on the bumper. Next, the wheel 12 is manipulated until the plate 7 takes up any slack in chains 16 thereby securely clamping the frame 4 to the bumper.

Extending rearwardly from the apex of V-section 13 is an apertured ear 18 which projects between the apertured ears 19, 21 extending from the tubular member 22. All of the apertures in the aforesaid ears are lined-up and receive therethrough a bolt having the head 24 and cooperating nut 25. (The shank of this bolt does not show.) Nut 25 may be in the form of the enlarged hand wheel shown in the drawings. Thus the tubular member 22 is pivotally mounted on frame 4 and is adjustable in a plurality of positions by means of the nut 25. Loosening of this nut will permit adjustment, whereas tightening of same will hold the member 22 in one position.

Cooperating with the member 22 is an elongated member in the form of rod 26 slidably engaging the bore 27 in member 22. A set-screw 28, which may have its head in the form of an enlarged hand wheel 29 locks the rod 26 in any pre-selected position with respect to frame 4. The rod normally extends upwardly from the frame and on its upper end is pivotally mounted at 31 the clamping means 32 comprising the clamping jaws 33, 34 relatively reciprocable toward one another for clamping and holding action.

As previously set forth above, assume the frame 4 to be securely clamped to the rear bumper of a vehicle. The trunk lid 20 of the vehicle can now be lifted to its uppermost position and the rod 26 positioned in the tubular member 22 to hold the trunk lid in its open position. It may be necessary to adjust the pivotal arrangements but once all adjustments are made, and locked in place by the various hand wheels provided, the trunk lid will be held securely and safely in the open position. The manner in which the holding device cooperates with the bumper and trunk lid of a vehicle is shown clearly in Figure 4.

From the above, it will be seen that a simple rugged holding device has been devised having particular utility to that group of artisans known as automobile mechanics. Its portability, adjustability, ease of operation, and ruggedness make this arrangement a reliable and useful tool having many uses over and above the example set forth above.

I claim:

1. A portable device for holding open a closure member of a vehicle, such as a trunk cover, engine cover, or the like, comprising, in combination: a main supporting body in the form of a rigid metallic frame having a pair of spaced legs projecting outwardly therefrom, a plate carried by said frame and mounted between the legs thereof, means for reciprocally moving said plate with respect to said legs, a pair of flexible members carried by said frame, each of said flexible members having hooks affixed to their outer ends and having their inner ends adjustably mounted on corresponding legs of said frame whereby the length of said flexible members may be varied, said plate and said hooks being adapted to contact opposite faces of a part of said vehicle to clamp said frame to said vehicle, an elongated rod, means for pivotally mounting said rod on said frame, said rod extending upwardly from said frame and being adjustably mounted thereon whereby its upper end is positioned at a variable distance from said frame, and holding means affixed to the said upper end for holding open said closure member.

2. The combination defined in claim 1 wherein each of said legs carries a mounting stud for said flexible members, the axes of said studs forming acute angles with said plate, and said flexible members comprise a pair of chains, the links of said chains being adapted to engage said studs whereby the length of chain between said studs and said hooks may be varied.

3. The combination defined in claim 2 wherein said plate has an elongated threaded shank extending rearwardly therefrom between said legs, and a captive nut engaging said shank, said nut being in the form of a hand operable wheel.

4. The combination defined in claim 3 wherein the mounting means for said rod comprises a tubular member having a bore for slidably engaging said rod, said tubular member having a pair of identical juxtaposed apertured ears, said U-shaped frame having a cooperating apertured ear extending between said identical pair of ears, and a bolt extends through said apertures, said tubular member being pivoted about said bolt, said bolt having a cooperating nut for clamping said tubular member in any preselected position.

5. The combination defined in claim 4 wherein a setscrew is provided in said tubular member to clamp said rod in any pre-selected position, the head of said set-screw and said last-named nut being in the form of hand operable wheels.

References Cited in the file of this patent

UNITED STATES PATENTS

| 575,857 | Sly | Jan. 26, 1897 |
| 840,241 | Nootboar | Jan. 1, 1907 |
| 1,211,005 | Stroud | Jan. 2, 1917 |
| 1,579,136 | Paxson | Mar. 30, 1926 |
| 1,798,955 | Schwerin | Mar. 31, 1931 |
| 2,434,598 | Stegall | Jan. 13, 1948 |
| 2,436,499 | Williams | Feb. 24, 1948 |
| 2,532,168 | Jakoubek | Nov. 28, 1950 |

FOREIGN PATENTS

| 346,025 | Germany | Dec. 23, 1921 |